(12) United States Patent
Silc et al.

(10) Patent No.: US 8,642,890 B2
(45) Date of Patent: Feb. 4, 2014

(54) METHOD AND APPARATUS FOR COMMUNICATING BETWEEN A CAB AND CHASSIS OF A TRUCK

(76) Inventors: Ron Silc, Houston, TX (US); Kelly Gonzer, Houston, TX (US)

( * ) Notice: Subject to any disclaimer, the term of this patent is extended or adjusted under 35 U.S.C. 154(b) by 0 days.

(21) Appl. No.: 12/774,636

(22) Filed: May 5, 2010

(65) Prior Publication Data

US 2013/0092436 A1   Apr. 18, 2013

(51) Int. Cl.
*H01B 7/00* (2006.01)
(52) U.S. Cl.
USPC ........................................ 174/113 R
(58) Field of Classification Search
USPC ............................. 174/113 R, 33
See application file for complete search history.

(56) References Cited

U.S. PATENT DOCUMENTS

| | | | | |
|---|---|---|---|---|
| 6,121,551 A | * | 9/2000 | Dobrow | 174/113 R |
| 6,336,826 B1 | * | 1/2002 | Kraft | 439/498 |
| 6,483,200 B1 | * | 11/2002 | Jacobs | 307/10.1 |
| 7,485,811 B2 | * | 2/2009 | Mjelstad | 174/113 R |
| 2008/0236867 A1 | * | 10/2008 | Varkey et al. | 174/115 |

* cited by examiner

*Primary Examiner* — Chau Nguyen
(74) *Attorney, Agent, or Firm* — Kermit D. Lopez; Luis M. Ortiz; Ortiz & Lopez, PLLC

(57) ABSTRACT

An apparatus for communicating between a cab and a chassis of a truck comprises a multi-conductor cable having a plurality of circuits. The multi-conductor cable is of a length to extend substantially the length of the chassis, to carry various communication functions between the cab and a distal end of the chassis.

1 Claim, 3 Drawing Sheets

US 8,642,890 B2

METHOD AND APPARATUS FOR COMMUNICATING BETWEEN A CAB AND CHASSIS OF A TRUCK

BACKGROUND OF THE INVENTION

1. Field of the Invention

The present invention relates to a method and apparatus, for communicating between a cab and chassis of a truck. More particularly, it relates to improvements in establishing connections between various circuits and functions that may be found in the truck, including without limitation DC low voltage power sources, ground, video, audio and data signals, imaging technology, reverse sensors and various other information technologies that may be incorporated into a truck.

2. Description of the Prior Art

Numerous innovations for cables have been provided in the prior art that will be described. Even though these innovations may be suitable for the specific individual purposes to which they address, however, they differ from the present invention.

It has been common for manufacturers of truck chassis to install two cables in a wire loom on each truck chassis to facilitate later installation of and connection to cables run by truck body manufacturers. Likewise, it has been common for truck body manufacturers to install two cables in the bodies which can be mated to the cables on each truck chassis and to cameras and radar present on the body in order to allow electrical, video and audio to pass through the same cable. Typically, the cables were added to a body and a chassis separately and then connected. In some cases, Cables were added individually, and in some cases, in bundles, for each discrete function desired on the truck.

It is apparent now that numerous innovations for cables have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a method and apparatus for communicating between a cab and a chassis of a truck that avoids the disadvantages of the prior art.

ANOTHER OBJECT of the present invention is to provide a method and apparatus for communicating between a cab and a chassis of a truck that is simple and inexpensive to manufacture and install.

STILL ANOTHER OBJECT of the present invention is to provide a method and apparatus for communicating between a cab and a chassis of a truck that is simple to use.

BRIEFLY STATED, STILL YET ANOTHER OBJECT of the present invention is to provide an apparatus for communicating between a cab and a chassis of a truck comprises a multi-conductor cable having a plurality of circuits. The multi-conductor cable is of a length to extend substantially the length of the chassis, to carry various communication functions between the cab and a distal end of the chassis.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
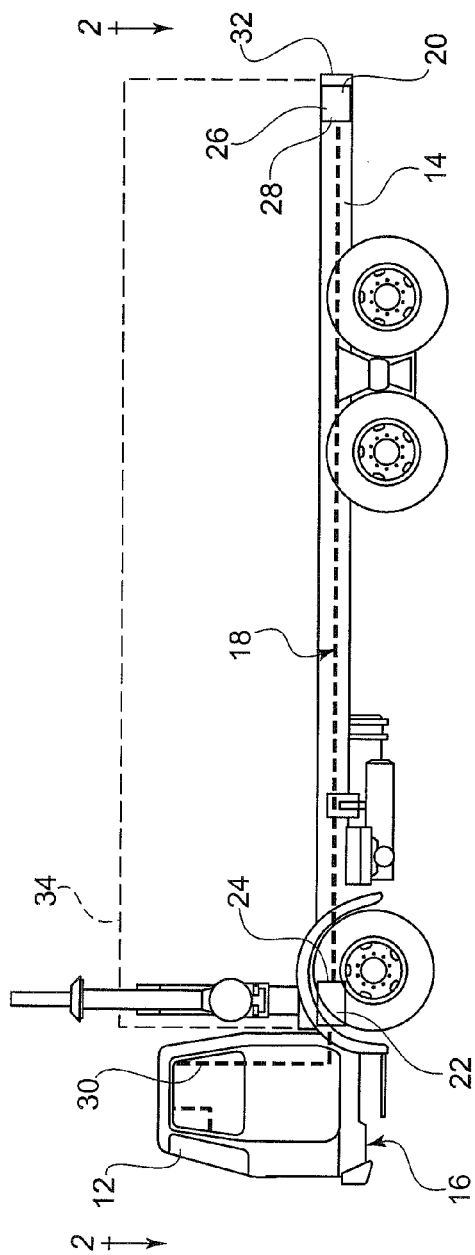
FIG. 1 is a side view of a truck with the present invention installed in place and ready for use.
Figure 2:
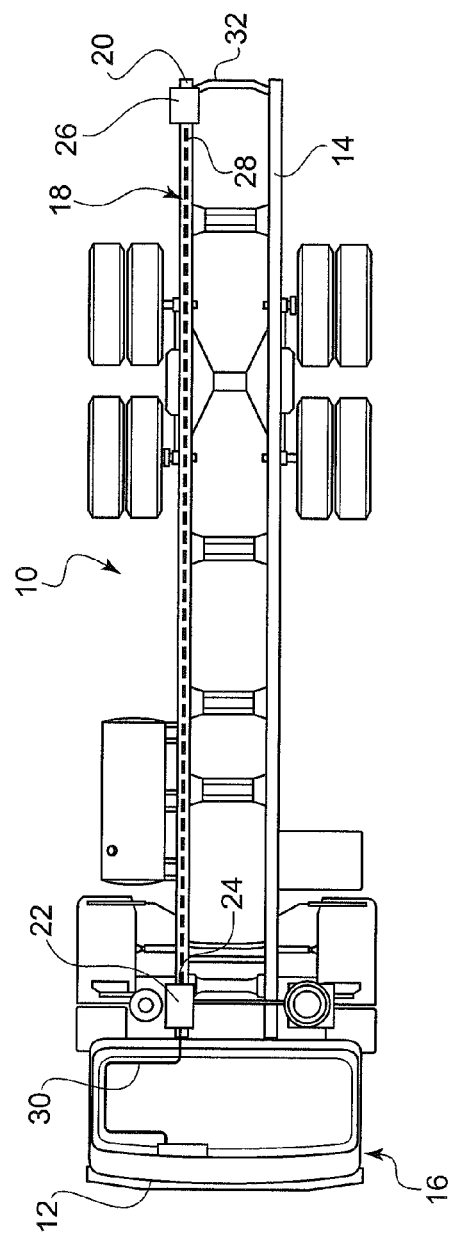
FIG. 2 is a top view taken in the direction of arrow 2 in FIG. 1.
Figure 3:
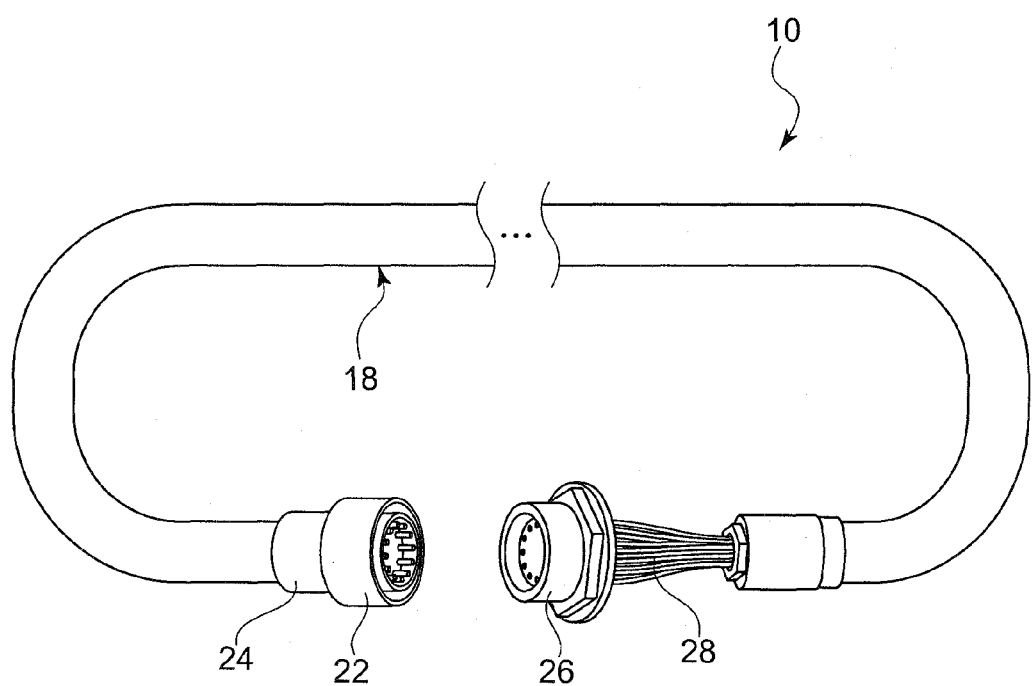
FIG. 3 is a perspective view showing the present invention rolled up before being installed within the truck.

REFERENCE NUMERALS UTILIZED IN THE DRAWING 10 apparatus
12 cab of truck 16
14 chassis of truck 16
16 truck
18 multi-conductor cable of apparatus 10
20 distal end of chassis 14
22 socket connector of multi-conductor cable 18
24 first end of multi-conductor cable 18
26 pin connector of multi-conductor cable 18
28 second end of multi-conductor cable 18
30 wiring system in cab 12
32 wiring system in distal end 20
34 body of truck 16
36 signal flow diagram

DETAILED DESCRIPTION OF THE PREFERRED EMBODIMENT

Referring now to the figures, in which like numerals indicate like parts, and particularly to FIGS. 1 through 4, and as such, will be discussed with reference thereto.

The present invention is an apparatus 10 for communicating between a cab 12 and a chassis 14 of a truck 16 which comprises a multi-conductor cable 18 having a plurality of circuits. The multi-conductor cable 18 is of a length to extend substantially the length of the chassis 14, to carry various communication functions between the cab 12 and a distal end 20 of the chassis 14.

The multi-conductor cable 18 comprises a socket connector 22 at a first end 24 and a pin connector 26 at a second end 28. The socket connector 22 is electrically connected to a wiring system 30 in the cab 12, while the pin connector 26 is electrically connected to a wiring system 32 at the distal end 20 of the chassis 14. The circuits of the multi-conductor cable 18 comprises a twenty-one cable bundle having five 18 AWG insulated conductors and four jacketed 22 AWG quads, with two shielded pairs in each quad. Preferably, the cable is a multi-conductor cable designed to carry low voltage DC power, ground, video, audio and data. Performing as a "pass-through" cable with connectors, it is capable of carrying both analog and digital signals and adaptable for J-1939/CAN.

To provide communication between the cab 12 and the chassis 14 of the truck 16, the following steps should be taken:

1. Mount the multi-conductor cable 18 having the plurality of circuits therein, being of the twenty-one cable bundle having five 18 AWG insulated conductors and four jacketed 22 AWG quads, with two shielded pairs in each quad, along the length of the chassis 14 between the cab 12 and the distal end 20 of the chassis 14, before the body 34 of the truck 16 is attached to the chassis 14.

2. Electrically connect the socket connector 22 on the first end 24 of the multi-connector cable 18 to the wiring system in the cab 12.

3. Electrically connect the pin connector 26 on the second end 28 of the multi-connector cable 18 to the wiring system 32 at the distal end 20 of the chassis 14, to carry the various communication functions between the cab 12 and the distal end 20 of the chassis 14.

The present invention being the multi-conductor cable 18 with the circuits having the twenty-one bundle may be run in the chassis 14 prior to the body 34 being placed on the chassis 14. The multi-conductor cable 18 may also be put in place after the body 34 has been installed, but the routing of the multi-conductor cable 18 will be more difficult to accomplish in such a situation. Thus, the multi-conductor cable 18 of the present invention provides a single universal harness with generic connectors 22,26 that becomes the communications backbone between the cab 12 and chassis 14 of the truck 16.

Ideally, DEUTSCH connectors, which are standard in the trucking industry, can terminate at each end 24,28 of the multi-conductor cable 18, providing easy access and economical connectivity for imaging technology, sensors and various information technologies. However, departure from the DEUTSCH connectors to another connector for a given use is contemplated and may be included in the present invention. For example, without limitation, a 3rd Eye Refuse Advanced Safety System Truck Rear Component Interface Adapter (not shown) can be utilized to indicate how the preferred DEUTSCH connector is used with a PRECO camera system. If the radar changes its connector, it is anticipated that the DEUTSCH connector would likewise be changed.

The multi-conductor cable 18 of the present invention comprises the five 18 AWG insulated conductors and four jacketed 22 AWG quads with two shielded pairs in each quad. This arrangement in the multi-conductor cable 18 is clearly depicted and appreciated by reference to FIGS. 1 through 3. The construction of the multi-conductor cable 18 provides significant advantages, including that all the twenty-one circuits may be run inside a single casing of the multi-conductor cable 18, providing ease of identification and placement in the Chassis 14 of the truck 16.

Figure 4:
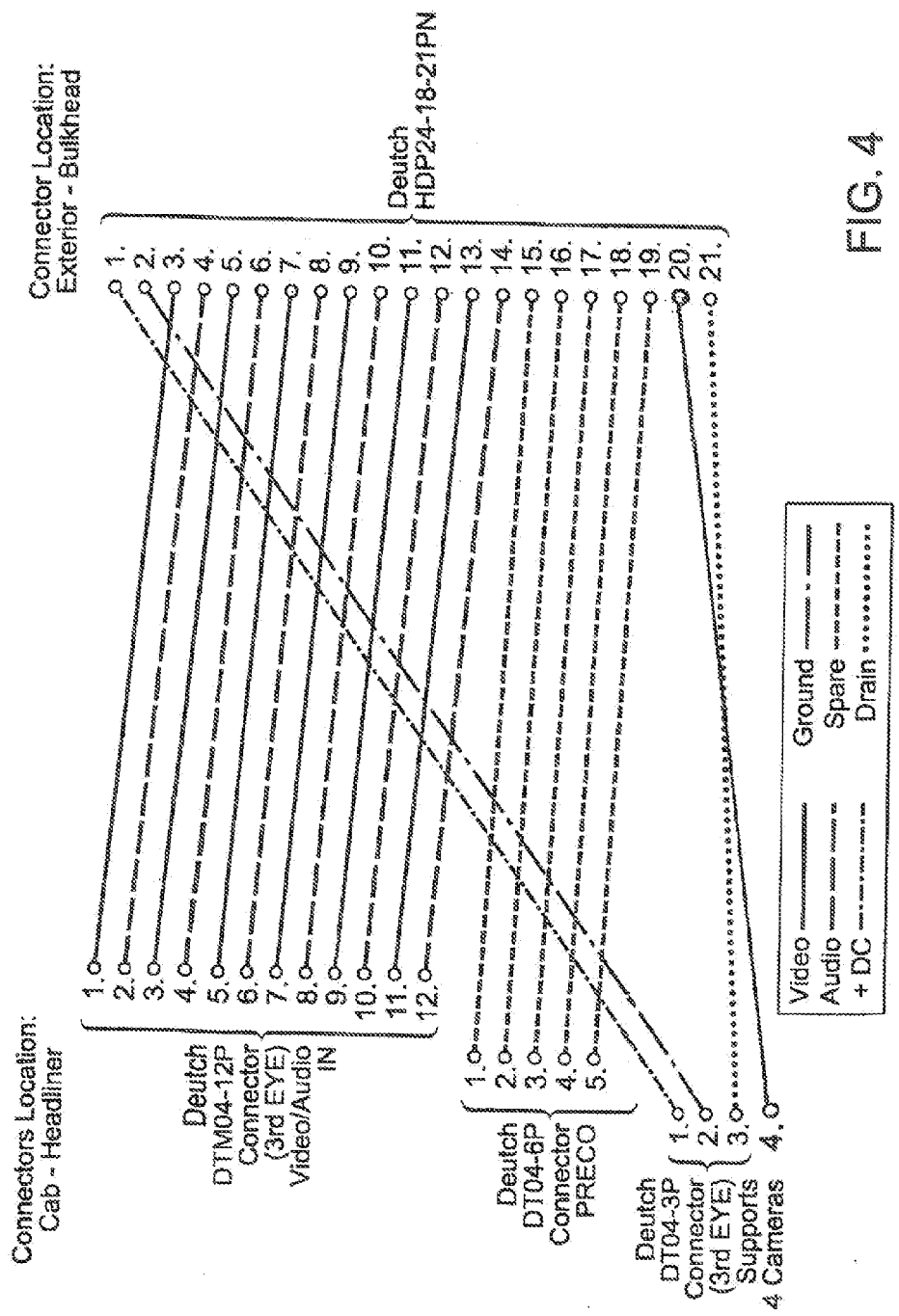
FIG. 4 is a signal flow diagram of the present invention.

In FIG. 4, a signal flow diagram shows the preferred connection paths for video, audio, radar and support camera to the single twenty-one cable bundle in the multi-conductor cable 18.

It will be understood that each of the elements described above, or two or more together, may also find a useful application in other types of constructions differing from the types described above.

While the invention has been illustrated and described as embodiments of a method and apparatus for communicating between a cab and a chassis of a truck, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A method for communicating between a cab and a chassis of a truck comprising the steps of:
   a) mounting a multi-conductor cable having a plurality of circuits therein, being of a twenty-one cable bundle having five 18 AWG insulated conductors and four jacketed 22 AWG quads, with two shielded pairs in each quad, along the length of the chassis between the cab and a distal end of the chassis, before a body of the truck is attached to the chassis;
   b) electrically connecting a socket connector on a first end of said multi-connector cable to a wiring system in the cab; and
   c) electrically connecting a pin connector on a second end of said multi-connector cable to a wiring system at the distal end of the chassis to carry various communication functions between the cab and the distal end of the chassis.

* * * * *